United States Patent [19]

Kramarczyk et al.

[11] Patent Number: 5,351,242
[45] Date of Patent: Sep. 27, 1994

[54] METHOD AND APPARATUS FOR CONFIGURING AND MAINTAINING TOKEN RING NETWORKS

[76] Inventors: Marian Kramarczyk, 22 Lancaster Dr., Suffern, N.Y. 10501; David Foni, 300 Winston Dr., Apt. #1921, Cliffside Park, N.J. 07010; Haim Jacobson, 20 Inness Rd., Tenafly, N.J. 07670

[21] Appl. No.: 868,761

[22] Filed: Apr. 14, 1992

[51] Int. Cl.$^5$ ............................................. H04J 3/02
[52] U.S. Cl. .................................. 370/85.5; 370/85.15; 340/891.05
[58] Field of Search ............ 370/16.1, 85.5, 16, 370/85.15, 13, 17; 371/71, 67.1, 20.6, 68.2; 375/3, 3.1, 10, 7; 379/1, 2, 4, 24, 25, 26, 32, 33; 455/67, 115; 340/84.05

[56] References Cited

U.S. PATENT DOCUMENTS

| | | | |
|---|---|---|---|
| 4,404,557 | 9/1983 | Grow | 370/85.5 |
| 4,454,508 | 6/1984 | Grow | 370/85.5 |
| 4,482,999 | 11/1984 | Janson et al. | 370/85.5 |
| 4,507,777 | 3/1985 | Tucker et al. | 370/16.1 |
| 4,566,097 | 1/1986 | Bederman | 370/85.5 |
| 4,593,280 | 6/1986 | Grow | 370/85.5 |
| 4,638,477 | 1/1987 | Okada et al. | 370/13 |
| 4,648,088 | 3/1987 | Cagle et al. | 370/16.1 |
| 4,663,748 | 5/1987 | Karbowiak et al. | 370/85.4 |
| 4,674,086 | 6/1987 | Szczepanek et al. | 370/85.5 |
| 4,680,757 | 7/1987 | Murakami et al. | 370/85.4 |
| 4,718,061 | 1/1988 | Turner | 370/85.6 |
| 4,726,018 | 2/1988 | Bux et al. | 370/85.5 |
| 4,728,901 | 3/1988 | Pepper | 330/300 |
| 4,731,784 | 3/1988 | Keller et al. | 370/85.5 |
| 4,736,368 | 4/1988 | Szczepanek | 370/85.5 |
| 4,766,530 | 8/1988 | Roslund | 395/200 |
| 4,771,391 | 9/1988 | Blasbalg | 370/85.2 |
| 4,771,419 | 9/1988 | Graves et al. | 370/60 |
| 4,779,261 | 10/1988 | Yamagishi et al. | 370/16 |
| 4,779,267 | 10/1988 | Limb | 370/85.5 |
| 4,789,982 | 12/1988 | Coden | 370/85.5 |
| 4,803,485 | 2/1989 | Rypinski | 370/85.15 |
| 4,806,927 | 2/1989 | Arai | 370/85.15 |
| 4,807,224 | 2/1989 | Naron et al. | 370/85.5 |
| 4,819,229 | 4/1989 | Pritty et al. | 370/94.1 |
| 4,827,640 | 5/1989 | Jones | 40/27.5 |
| 4,837,488 | 6/1989 | Donahue | 324/66 |
| 4,843,606 | 6/1989 | Bux et al. | 370/85.4 |
| 4,845,709 | 7/1989 | Matsumoto et al. | 370/85.5 |
| 4,860,284 | 8/1989 | Brown et al. | 370/85.12 |
| 4,864,491 | 9/1989 | Ohuchi | 395/425 |
| 4,866,704 | 9/1989 | Bergman | 370/85.4 |
| 4,872,125 | 10/1989 | Catlin | 364/578 |
| 4,873,656 | 10/1989 | Catlin | 364/578 |
| 4,878,219 | 10/1989 | Kaufman et al. | 370/85.5 |
| 4,881,074 | 11/1989 | Reichbauer et al. | 370/14 |
| 4,882,728 | 11/1989 | Herman | 370/85.1 |
| 4,890,304 | 12/1989 | Annamalai | 375/114 |
| 4,901,312 | 2/1990 | Hui et al. | 370/85.12 |
| 4,905,230 | 2/1990 | Madge et al. | 370/85.5 |

(List continued on next page.)

*Primary Examiner*—Wellington Chin
*Assistant Examiner*—Ajit Patel
*Attorney, Agent, or Firm*—Darby & Darby

[57] ABSTRACT

An enhanced MAU (EMAU) is provided which can be used in token ring networks in place of existing MAUs, yet permits each station on the network to be selectively connected to any one of a plurality of different token ring trunk cables. The EMAU uses the conventional trunk coupling units (TCU) of an MAU, which permit a station to be connected in the ring or to be bypassed, but adds to each TCU a multi-switch device which permits the TCU to be connected to one of a plurality of ring trunk cables while providing a bypass across the station in the remaining ring trunk cables. In addition, the EMAU provides sensing of the input and output signal for each station, which permits the EMAU to monitor the address produced by each station during the normal ring polling process which occurs during neighbor notification operation of the token ring network. Each address is then stored in a location associated with the physical location of a station. Sensing of the input and output signal is also utilized to perform a peak amplitude comparison between the two, to derive signals indicative of the input-output operability of each station.

11 Claims, 7 Drawing Sheets

U.S. PATENT DOCUMENTS

| | | | |
|---|---|---|---|
| 4,914,652 | 4/1990 | Nguyen | 370/85.5 |
| 4,916,647 | 4/1990 | Catlin | 364/578 |
| 4,932,023 | 6/1990 | Geyer et al. | 370/85.4 |
| 4,935,953 | 6/1990 | Appel et al. | 379/53 |
| 4,941,142 | 7/1990 | Kida | 370/85.5 |
| 4,944,038 | 7/1990 | Hardy et al. | 370/85.5 |
| 4,945,548 | 7/1990 | Iannarone et al. | 370/102 |
| 4,953,194 | 8/1990 | Hansen et al. | 379/25 |
| 4,964,113 | 10/1990 | Geyer et al. | 370/85.5 |
| 4,972,437 | 11/1990 | Citron et al. | 375/37 |
| 4,979,167 | 12/1990 | McCool | 370/85.12 |
| 4,985,888 | 1/1991 | Madge et al. | 370/85.12 |
| 4,987,568 | 1/1991 | Shinada et al. | 370/15 |
| 4,998,246 | 3/1991 | Tanaka | 370/85.5 |
| 5,001,730 | 3/1991 | Franaszek et al. | 370/85.4 |
| 5,023,872 | 6/1991 | Annamalai | 371/5.1 |
| 5,029,159 | 7/1991 | Dolev | 370/94.1 |
| 5,046,182 | 9/1991 | Hamstra et al. | 370/79 |
| 5,051,986 | 9/1991 | Grow et al. | 370/85.5 |
| 5,053,946 | 10/1991 | Jain | 395/275 |
| 5,101,405 | 3/1992 | Bekki et al. | 370/85.15 |
| 5,132,832 | 7/1992 | Matz et al. | 370/85.5 |
| 5,132,962 | 7/1992 | Hobgood et al. | 370/16.1 |
| 5,142,526 | 8/1992 | Moriue et al. | 375/10 |

METHOD AND APPARATUS FOR CONFIGURING AND MAINTAINING TOKEN RING NETWORKS

FIELD OF THE INVENTION

The present invention relates generally to computer networks, and more particularly, concerns a method and apparatus for configuring and maintaining token ring networks.

BACKGROUND OF THE INVENTION

Local area networks (LANs) have come into widespread use in industry and business. The token ring network has become one of the most popular forms of LAN, owing to its implementation by the International Business Machines Corporation (IBM). Moreover, the standards for token ring networks are now well defined in IEEE standard 802.5 of the Institute of Electrical and Electronic Engineers and this standard has now been adopted as a draft International Standard ISO DIS 8802/5, so that a high degree of consistency and uniformity in token ring networks can now be expected.

In accordance with the IBM implementation, a nonintelligent, distributed concentrator, called a multi-station access unit (MAU) is utilized to provide access by stations to the token ring network. One of the major advantages of using MAUs is that they can be in a distributed configuration. That is, a MAU is therefore conveniently brought to a location, such as the location of a work group, and all of the users can be placed on the network by simply having their computers connected to the MAU through an appropriate cable. Internally, each MAU couples the connected stations in a series ring on a trunk cable, and individual MAUs can be connected in tandem through the trunk cable to form the overall network ring.

Although the use of distributed MAUs is a highly desirable and effective convenient network configuration the IBM implementation suffers from a number of shortcomings. First of all, it is only possible to connect all of the MAUs, and therefore all of the stations, in a single ring. As the number of stations grows, this results in access becoming increasingly more difficult and slower operation of the network. Token ring networks have been. available which provide multiple rings, but this has typically required sacrificing the distributed nature of the IBM implementation, with the resultant disadvantage that cables must be run from each station to a central location.

Another shortcoming of the IBM implementation the difficulty of determining the physical location of a station in the network. Although each station has a unique address, the system supervisor has no way of knowing the physical location of the station on the ring unless he keeps track of it himself when first installing new users. Furthermore, this could present a serious security problem, in that, should an unauthorized user connect his station to the network, it could be some time before the network supervisor could locate that user and physically disconnect him.

One recognized shortcoming of token ring networks is the difficulty of locating and isolating faulty stations. Fault detection procedures have been built into the operating protocol, but quick and efficient means for locating and isolating faults have not been available.

Broadly, it is an object of the present invention to provide a method and apparatus for configuring and maintaining token ring networks which avoid the shortcomings of existing methods and apparatus. It is specifically contemplated that the invention should not compromise the distributed nature of the IBM implementation of token ring net works.

It is another object of the invention to provide an apparatus for configuring token ring networks which will permit the use of distributed concentrators yet permit the selective assignment of individual stations to any one of a plurality of different, parallel communication rings of the network.

It is yet another object of the present invention to provide a method and apparatus for configuring and maintaining token ring networks which will automatically detect the address of a station connected to the network and associate that station's address with the station's physical location.

It is yet another object of the present invention to provide a method and apparatus for configuring and maintaining token ring networks which will permit rapid and convenient monitoring of the operational status of each station of the network.

It is also an object of the present invention to provide a method and apparatus for configuring and maintaining token ring networks which are convenient and reliable in use, yet relatively inexpensive to install and maintain.

In accordance with an illustrative embodiment demonstrating objects and features of the present invention, an enhanced MAU (EMAU) is provided which can be used in token ring networks in place of existing MAUs yet permits each station on the network to be selectively connected to any one of a plurality of different token ring trunk cables. The EMAU uses the conventional trunk coupling units (TCU) of an MAU, which permit a station to be connected in the ring or to be bypassed, but adds to each TCU a multi-switch device which permits the TCU to be connected to one of a plurality of ring trunk cables while providing a bypass across the station in the remaining ring trunk cables.

In addition, the EMAU provides sensing of the input and output signal for each station. This permits the EMAU to monitor the address produced by each station during the normal ring polling process which occurs during neighbor notification operation of the token ring network. It is then possible to associate each address with a physical location of a station, since the physical location is known. Sensing of the input and output signal is also utilized to perform a peak amplitude comparison between the two, to derive signals indicative of the input-output operability of each station.

The foregoing brief description, as well as further objects, features, and advantages of the present invention will be understood more completely from the following detailed description of a presently preferred, but nonetheless illustrative, embodiment of the invention, with reference being had to the accompanying drawings in which:

DETAILED DESCRIPTION OF THE PREFERRED EMBODIMENT

Figure 1:
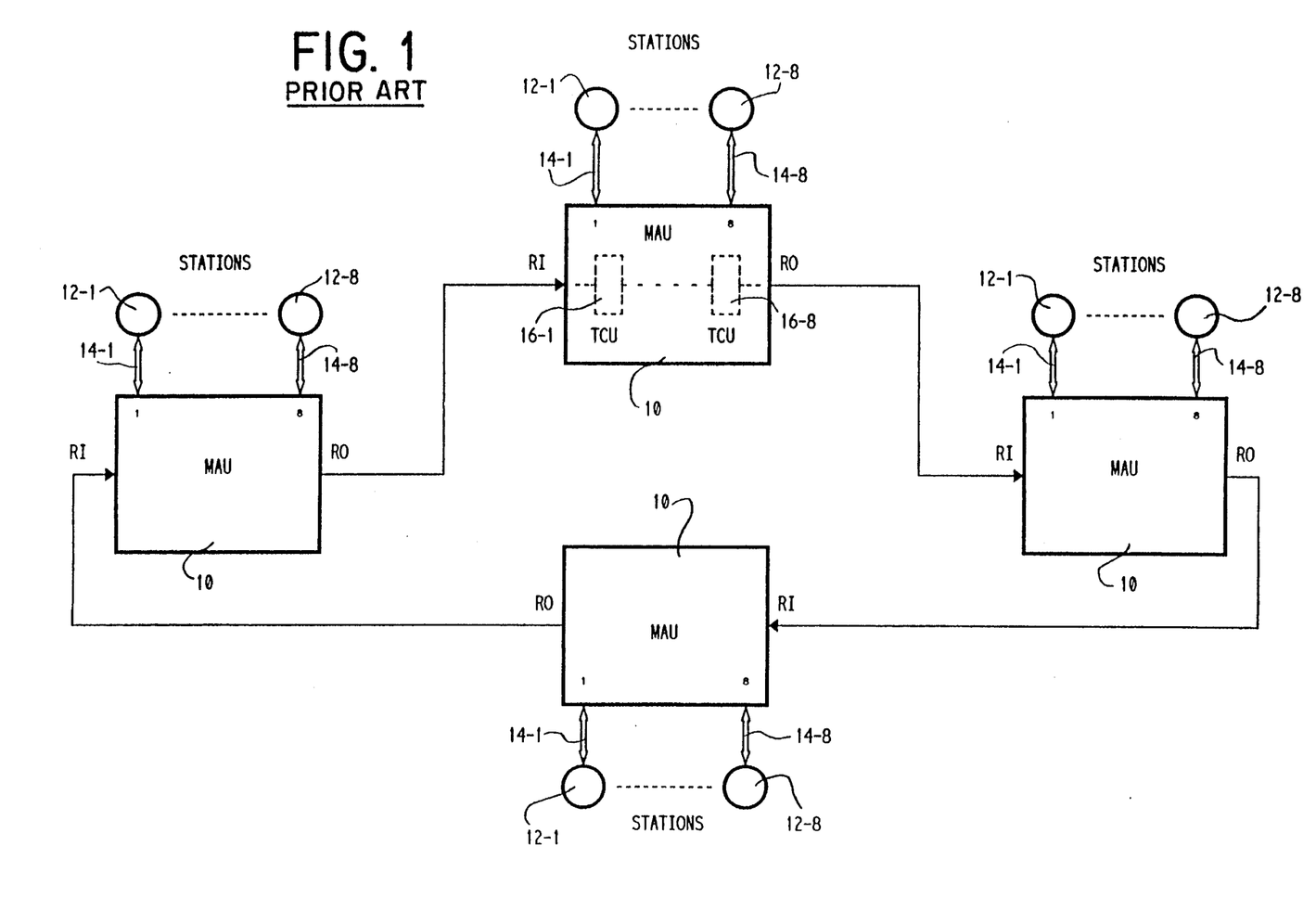
FIG. 1 is a functional block diagram illustrating a token ring local area network in accordance with the IBM implementation.

The functional block diagram of FIG. 1 illustrates a token ring local area network as implemented by IBM. The fundamental building block of the network is the multi-station access unit (MAU) 10, which serves to permit the connection of, for example, eight stations, 12-1 through 12-8, to the network, each via a pair of cables, preferably twisted pair cables (14-1 through 14-8). Within each MAU 10, each station is connected to a trunk coupling unit (TCU), 16-1 through 16-8, and the trunk coupling units within the MAU are connected in series between a ring input RI and a ring output RO of the MAU. Thus, a simple token ring network could be formed by connecting RO of a MAU to RI of the MAU via shielded twisted pair cable. As shown in FIG. 1, larger networks may be formed by connecting RO of a MAU to a RI of the next MAU, forming a series connection, until the RO of the last MAU is connected to the RI of the first MAU. After this connection is made, all of the stations in all of the MAUs are in a series loop.

The details of token ring network connections and operation are discussed in IEEE Standard 802.5 and in Tucker et al. U.S. Pat. No. 4,507,777 and the disclosures of these references are incorporated herein by reference.

Figure 2:
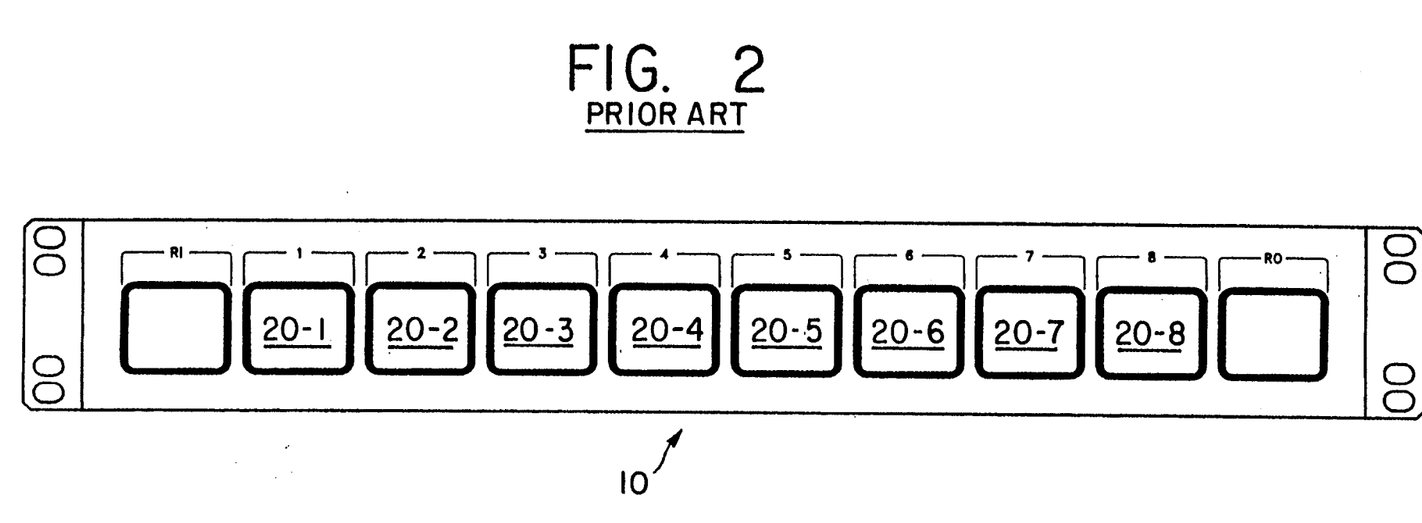
FIG. 2 illustrates a control panel of conventional MAU.

FIG. 2 illustrates the control panel of a conventional MAU 10. The MAU includes 10 receptacles for receiving a medium interface connector in accordance with Standard 802.5 (other forms of receptacles and connections may be used, such as modular telephone plugs and jacks), the leftmost receptacle corresponding to the connection for RI and rightmost receptacle corresponding to the connection for RO. The remaining eight receptacles 20-1 through 20-8 correspond to the connections for stations 12-1 through 12-8. The MAU 10 has no power of its own, but extracts power from the station connected to the MAU. The MAU is able to detect the presence of a station when DC power is present at a receptacle. It will then connect the particular device in the ring and permit it to initiate the normal network insertion procedure for a new station. Similarly, when the power provided by a station disappears, the MAU disconnects the station from the ring and loops its output back to its inputs.

Figure 3:
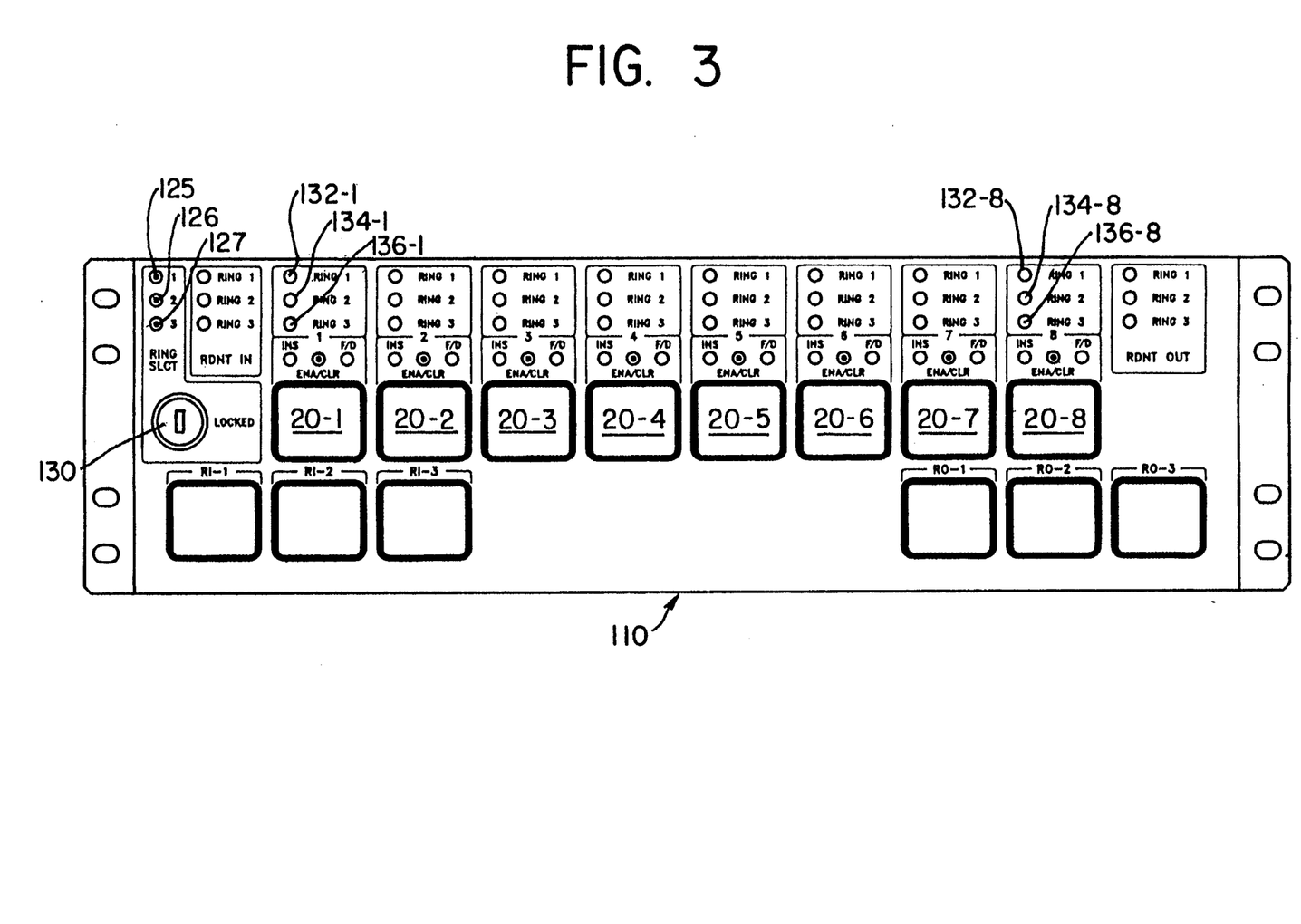
FIG. 3 illustrates a control panel of an enhanced MAU (EMAU) embodying the method and apparatus of the present invention.

FIG. 3 illustrates the control panel 111 of an enhanced MAU (EMAU) 110 in accordance with the present invention. This device is intended to be a replacement for a conventional MAU and includes all of the features of a conventional MAU, which are operated in the same manner. Above each of the receptacles 20-1 through 20-8 there is provided a pushbutton "EN/CLR", an indicator "F/D", and an indicator "INS." In operation, after a plug is inserted into one of the receptacles, the corresponding station is automatically inserted into the operational token ring. After the station satisfies the prescribed turn on procedure, the INSRT indicator is illuminated. When certain fault conditions are detected at a station, the station is automatically removed from the ring and its output signal is looped back to its input. At the same time the F/D indicator will be illuminated. As explained more fully below, the EMAU also detects "TIO status" conditions and some of these conditions constitute TIO faults which do not cause the station to be removed from the ring. Instead, the F/D indicator merely flashes on and off, to provide a warning. This condition of the F/D indicator may be released by pressing the EN/CLR button. It is also possible for the supervisor to selectively remove a station when a TIO fault occurs.

One major distinction of the EMAU 110 is that it has the ability to place a station in any one of a plurality, preferably three, internal rings. The device therefore includes three ring input connectors RI-1 through RI-3 and three ring output connectors RO-1 through RO-3. In order to place stations in selected rings, it is necessary for the system supervisor to operate ring select enable 130 by inserting and turning a key. The supervisor then depresses and holds down each of the ring pushbuttons (125, 126, and 127) in turn. While a pushbutton is being depressed, the supervisor sequentially depresses the EN/CLR button of each station to be placed in the corresponding ring, whereby the station is assigned to the corresponding ring and the INS indicator over the station's connector is illuminated. In addition, one of the ring indicators (132, 134, 136) over the station connector, which corresponds to the selected ring (e.g. "RING 1") is illuminated. Thus, by operating the ring select enable, the system supervisor may fully configure the three rings of EMAU 110 or make changes to an existing configuration, as desired, and he may then remove the key from ring select enable 130 to disable further modifications. This offers complete security in configuring the network.

Figure 4:
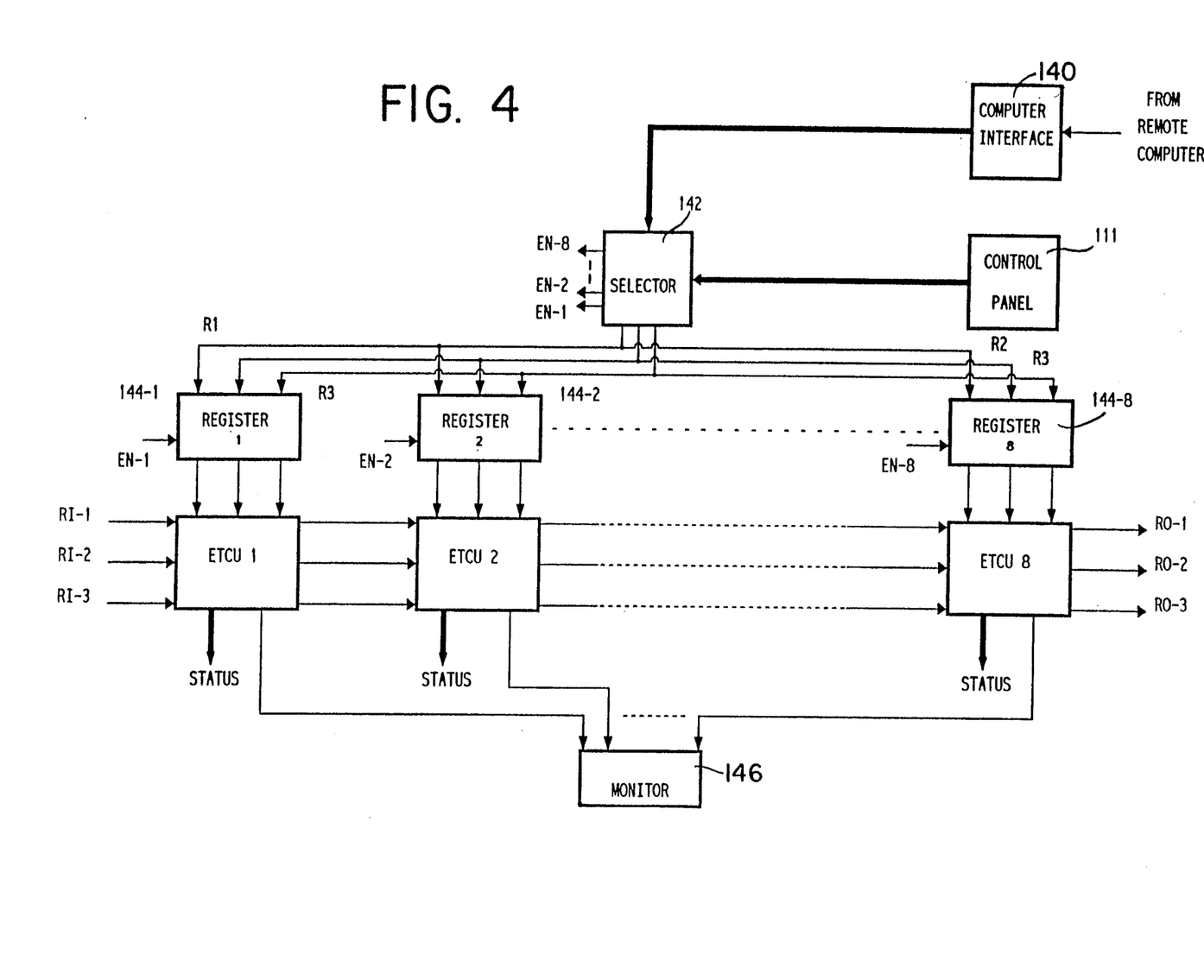
FIG. 4 is a functional block diagram useful in describing the structure and operation of an EMAU embodying the method and apparatus of the present invention.

The EMAU 110 also has a connector (not shown) such as a conventional RS-232 connector which permits a remote computer to communicate with the EMAU and to configure it, without operating the switches and pushbuttons provided on the control panel. FIG. 4 is a functional block diagram useful in describing the structure and operation of EMAU 110. The EMAU may be controlled manually by the control panel 111, as described above, or it may be similarly controlled from a remote computer, which provides signals equivalent to control panel 111 and communicates by conventional interface circuitry 140.

The signals from control panel 111 and interface 140 are provided to a selector switch 142. Selector 142 is a conventional device which selects either the signals from control panel 111 or computer interface 140 as the signals to control the EMAU, depending on which one is present. Thus, ring select enable 130 permits the supervisor to configure the EMAU manually and the same control may be asserted by the supervisor via a remote computer.

The signals passed by selector 142 are the ring select signals R1, R2, and R3, such as are provided by pushbuttons 125, 126 and 127 on control panel 111 and the EN signals for the eight stations, EN-1 through EN-8, such as are produced by the EN/CLR buttons above each of the stations connectors 20-1 through 20-8. These signals are applied to a set of registers 144-1 through 144-8 corresponding respectively to the stations in connectors 20-1 through 20-8, respectively. Specifically, the ring enable signals are applied as data inputs to the registers and the EN signals are applied to enable the registers to store these signals.

For example, assuming that the depression of one of pushbuttons 125, 126 and 127 causes the corresponding signal (R1, R2, and R3, respectively) to assume a high or logical "1" state and the other signals to remain in a low or logical "0" state, each of the registers would have a binary code "100" applied to it when pushbutton 125 is depressed. When the EN/CLR key for a particular station Is then depressed, this code is stored in the corresponding register.

The information stored in the registers 144-1 through 144-8 is used to control a set of enhanced trunk coupling units ETCU 1 through ETCU 8. As will be explained in detail below, these ETCUs are connected in series between RI-1 and RO-1, between RI-2 and RO-2, and between RI-3 and RO-3. Under control of its respective register, each ETCU will either connect all three cables in series through it, or it will connect a station on one of the cables and will connect the other two cables in series through it. Each ETCU also includes a traffic in-out (TIO) status detector 170, which compares the signal going to the corresponding station with the signal coming from the corresponding station and provides an indication of input-output status, one of these indications being a TIO fault (flashing of the corresponding F/D indicator) when the input and output are not substantially the same. Depressing the corresponding EN/CLR button results in the fault indicator being cleared.

In addition, each ETCU includes a tap for the signal arriving from a respective station, and each of these signals is applied to a special monitor 146. This monitor senses the address produced by each station during the normal ring polling process which occurs during neighbor notification (see e.g. Standard 802.5, Section 4.1.6. and U.S. Pat. No. 4,507,777). Inasmuch as the monitor is aware of the physical location of each station by virtue of its physical connection, the monitor is able to maintain a relationship between the physical location and the address of each station. This simplifies and speeds system maintenance when failures need to be isolated, and it minimizes down time.

Figure 5:
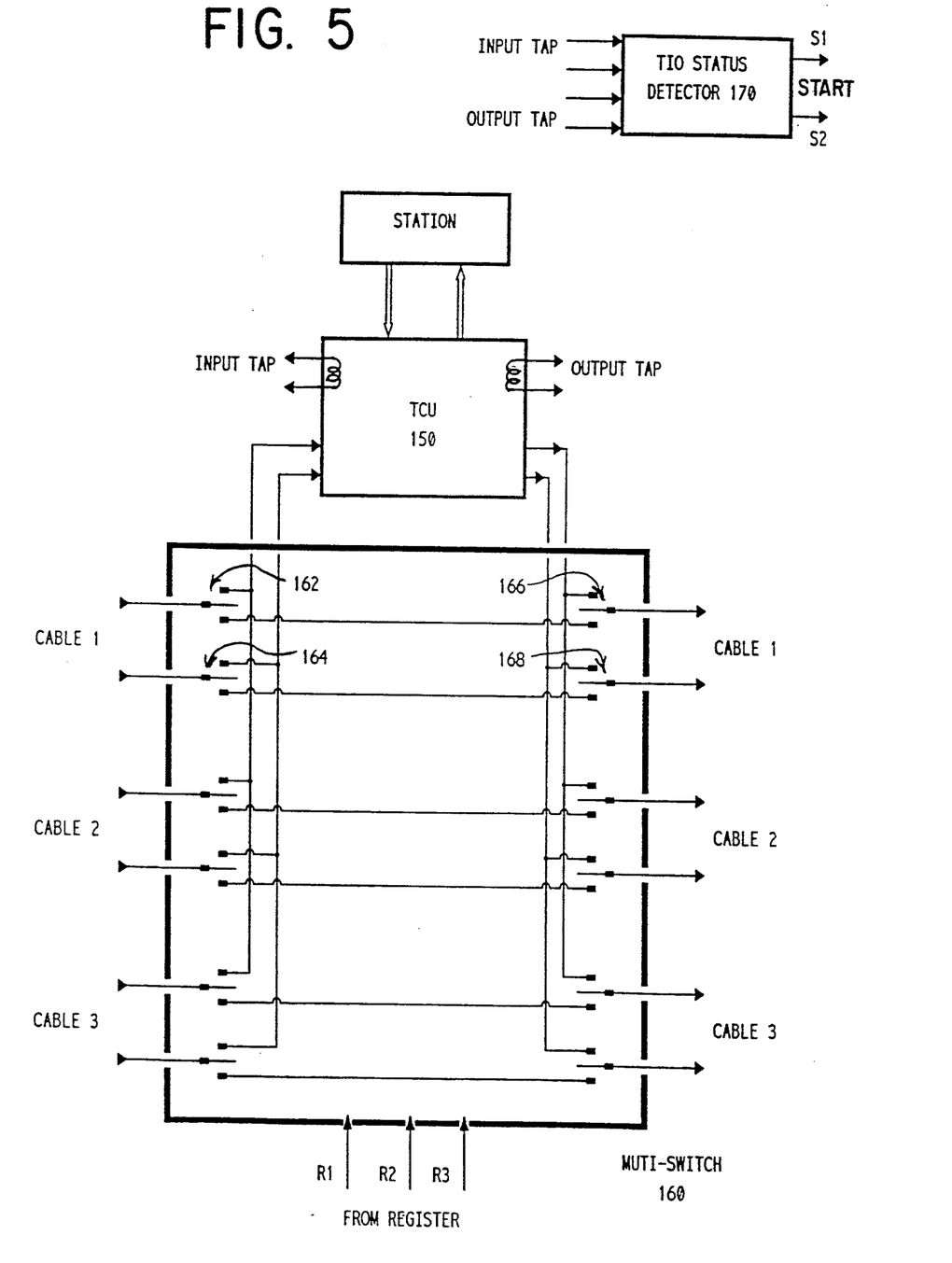
FIG. 5 is a schematic diagram of an enhanced trunk coupling unit embodying the method and apparatus of the present invention.

FIG. 5 is a schematic diagram of an ETCU. The device broadly comprises a conventional TCU 150 and a multi-switch 160. In a conventional TCU, transformers are utilized to provide balanced, differential input and output signals for the twisted pair cables. TCU 150 is modified by placing a tap winding on the input transformer and the output transformer, so that the input and output signals of the TCU may be sensed outside the TCU. Otherwise, TCU 150 is a conventional device and is operated in the conventional manner specified in Standard 802.5.

Multi-switch 160 includes a double pair of two-position switches dedicated to each cable, one pair of switches on the input side of the ETCU and one pair of switches on the output side of the ETCU. For example, cable 1 has switches 162 and 164 on the input side of cable 1 and switches 166 and 168 on the output side. All four switches are simultaneously in the same position, either up or down, depending upon the state of the corresponding bit in the register for the ETCU. It will be recalled that bit R1 corresponds to cable 1, bit R2 corresponds to cable 2, and bit R3 corresponds to cable 3. Assuming that bit R1 is in the logical "1" state, meaning that the station corresponding to the ETCU is to be connected on cable 1, switches 162 through 168 will be in their upward positions. Switches 162 and 164 then connect cable 1 to the input of TCU 150 and switches 166 and 168 connect Cable 1 to the output of TCU 150. At the same time, R2 and RO will be in the logical "0" condition, so that the switches corresponding to cables 2 and 3 will all be in the downward position, and multi-switch 160 will simply connect cables 2 and 3 straight through. Similarly, it is possible to connect all three cables straight through or to connect either cable 2 or cable 3 to. the TCU.

Figure 6:
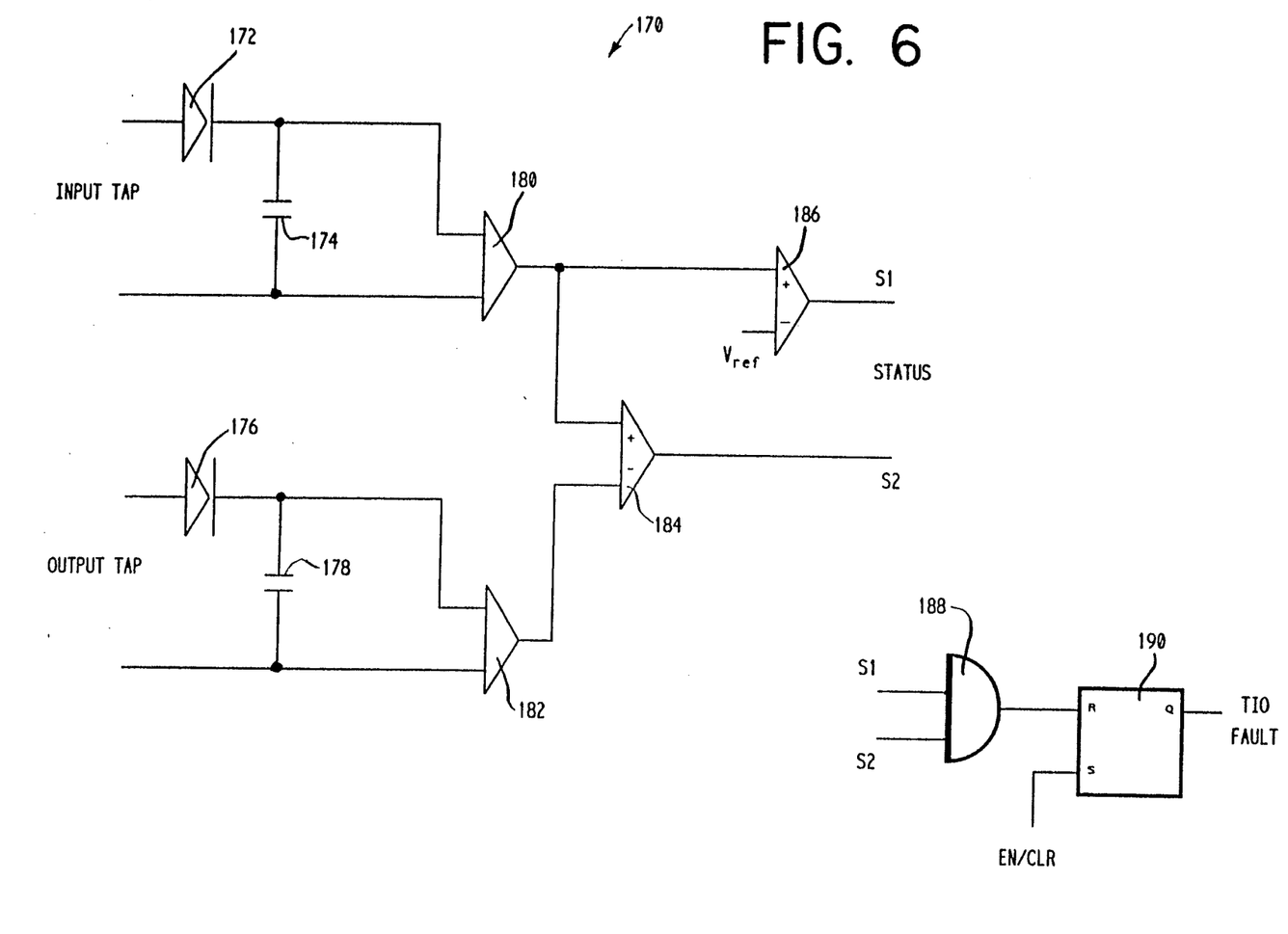
FIG. 6 is schematic block diagram illustrating a preferred form of TIO status detector 170 of FIG. 5.

As already mentioned, the ETCU compares the signals detected from the input tap and output tap of TCU 150 in order to generate TIO status signals in TIO status detector 170. FIG. 6 is a schematic diagram illustrating a preferred form of TIO status detector 170. The signalers from the input tap and the output tap are each applied to a peak detector comprising a diode and a capacitor (172 and 174 for the input tap and 176 and 178 for the output tap). Each of the peak detected signals is then applied to a differential buffer amplifier (180 for capacitor 174 and 182 for capacitor 178). The signal appearing between the outputs of amplifiers 180 and 182 therefor represents the difference between the peak detected signals. This difference signal is applied to a comparator 184, and the output of amplifier 180 is applied to a comparator 186, which receives a reference voltage Vref as its other input. In practice Vref is selected to be a value which would not be exceeded unless a signal were present on the input tap. The output of comparator 186 therefore constitutes a signal S1 which goes high only when a signal is present on the input tap. On the other hand, the output of comparator 184 constitutes signal $2 which goes high when the signals on the two taps are unequal. Together signals S1 and $2 define the TIO status of the corresponding station. Four conditions are possible, all or any of which may be detected.

For illustrative purposes, FIG. 6 also includes elements to detect a TIO fault. The S1 and $2 signals are applied as inputs to an AND gate 188. The output of this AND gate goes high when the input signal exceeds Vref and the input and output signals are unequal. This is an error situation, because the input and output of an ETCU should always be equal when a signal is present. Accordingly, the output of AND gate sets a flip-flop 190, which produces the TIO fault signal at its output. As already mentioned, this causes the F/D indicator to flash. Flip-flop 190 is reset by the EN/CLR signal, to remove the TIO fault indication. Thus, the FAULT signal goes high when a signal is present on the input tap and the output tap signal does not equal the input tap signal.

As mentioned above, monitor 146 senses the input tap of each ETCU. It does so in order to sense the address of the corresponding station during the neighbor notification process of Section 4.1.6. of Standard 802.5. This process is initiated by the active monitor when it transmits an Active Monitor Present (AMP) frame addressed to all stations. In this frame, the "address recognized" A bit and the "frame copy" C bit of the frame status field are both set to "0", as is normal. Like all frames, the AMP frame includes the address of the source station. The first station to receive the AMP frame notes that it is an dressed recipient and that the A and C bits are both "zero." It will therefore store the address of the source station and reverse the A bit to a "1" state. With the A bit set, stations which subsequently receive the AMP frame will respond to it.

Having responded to the AMP frame, the first station transmits a Stand By Monitor Present (SMP) frame when it next receives possession of the token. This frame will have the A and C bits reset to a "0" state, so that the next station downstream will respond to the SMP frame, storing the address of the previous station and reversing the A bit. This procedure continues until each station has transmitted a SMP frame, from which its address has been detected by its downstream neighbor. The process ends when the active monitor detects a SMP frame with the A and C bits reset to "0."

Figure 7:
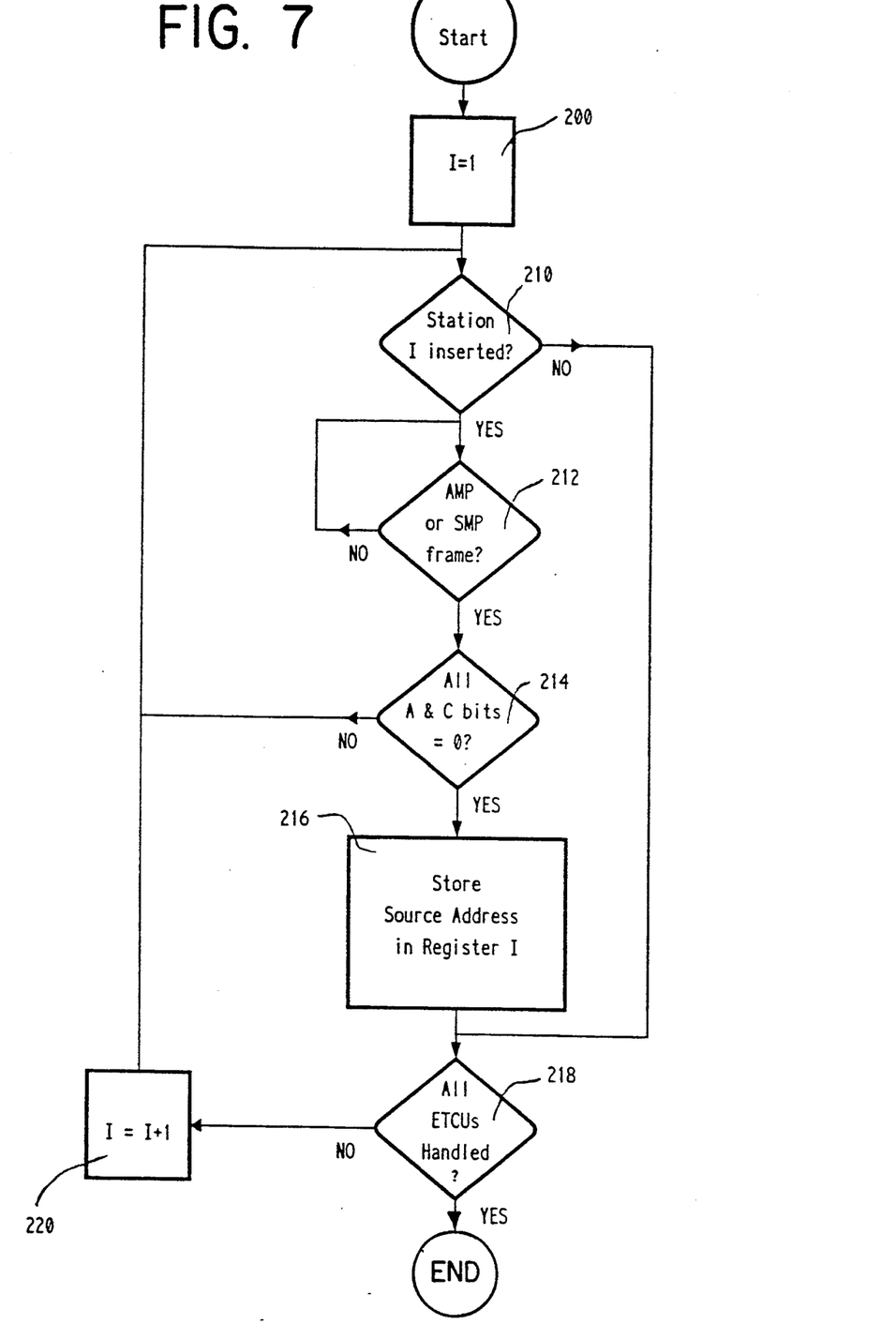
FIG. 7 is a flow chart illustrating the procedure for determining the address for all stations in accordance with the preferred embodiment of the present invention.

From the preceding discussion, it will be appreciated that it is necessary for monitor 146 to detect the occurrence on each input tap of an AMP or SMP frame with the A and C bits both reset to "0" at which time it stores the source address of the frame in a register dedicated to the corresponding ETCU. FIG. 7 is a flow chart illustrating the procedure for determining the addresses for all the stations. This procedure is preferably preformed by a microprocessor, which could also be programmed to perform the other functions of the EMAU (e.g. switching control, storage, etc.) The procedure of FIG. 7 would, preferably, be repeated periodically. Upon initiation of the procedure, an index, I, is initially set to 1 (block 200). At block 210, a test is then performed to determine whether or station I has been inserted. If it has not, control to block 218, and if it has the process continues to block 212. At this block a test is performed to determine whether an AMP or SMP frame has just been received, and this test is continued until such a frame is received. A test is then performed (block 214) to determine whether or not the A C bits of the frame are all equal to zero. If they are not, operation returns to block 210, and if they are, the source address contained in the frame is stored in the register associated with ETCU I (block 217). Operation then continues at block 218, where a test is performed to determine all ETCU have been handled. If so, the process ends; not, I is incremented (block 220), and the process continues at block 210. When this process ends, monitor 146 will contain the address of each station in a register dedicated to that station. Moreover, the physical connection of that station to the network is known by virtue of being aware the ETCU to which the station is connected. Accordingly, the location and address of each station are now correlated, which permits convenient and reliable maintenance.

From the foregoing description, it will be appreciated that the present invention offers a particularly convenient and efficient method and apparatus for configuring and maintaining token ring networks, without foregoing the advantages of utilizing equipment which is fully compatible with existing MAUs. Monitor 146 keeps a current regularly updated table which correlates a station's address with its physical location ( i.e. EMAU and connector). The TIO status detector provides a constant indication of input-output status and permits the supervisor to act promptly as situations occur which indicate errors. Although many problems can be handled from the supervisor's terminal, in unusual situations, he has the ability to pinpoint the physical location of a problem station and send a technical assistant to that location promptly for testing and/or remedial action. Even in very large networks with many EMAUs in diverse locations, a network supervisor can now easily reconfigure an maintain the network and immediately pinpoint the physical location of any station.

Although a preferred embodiment of the invention has been disclosed for illustrative purposes, those skilled in the art will appreciate that many of additions, modifications, and substitutions are possible without departing from the scope and spirit of the invention as defined in the accompanying claims. For example various aspects of the preferred embodiment have been shown in functional block diagram or schematic form, but those skilled in the art will appreciate that they could readily be realized with an appropriately programmed microprocessor. Similarly the method of FIG. 7 could be performed by wired circuits.

What is claimed is:

1. An apparatus for configuring and maintaining a token ring network having a plurality of separate, parallel network trunk cables defining different token rings of the network, a plurality of stations being selectively connected to the network trunk cables, said apparatus being of the type including a plurality of trunk coupling units each adapted to receive a cable connection from one of the stations and being serially connected on a common cable between input terminal means and output terminal means of the trunk coupling unit to provide, selectively, either connection of the station to the common cable or bypassing of the station on the common cable, said apparatus comprising at least one multi-switch dedicated to one of said trunk coupling units and comprising:

first and second coupling terminal means connected respectively to the input terminal means and output terminal means of said one trunk coupling unit for providing poles of said multi-switch;

first and second cable terminal means dedicated to each of said network trunk cables for providing further poles of said multi-switch; and two state switching means dedicated to each of said network trunk cables for providing a bypass between the first and second cable terminal means of the corresponding network trunk cable in a first of the two states of said two state switching means and for also providing, in a second of said states, a connection between the corresponding first cable terminal means and the first coupling terminal means, as well as a connection between the corresponding second cable terminal means and the second coupling terminal means.

2. The apparatus of claim 1, wherein each of said two state switching means is switched between its first and second states by means of an externally originating electrical control system.

3. The apparatus of claim 2, wherein a multi-switch is provided for each trunk coupling unit.

4. The apparatus of claim 1 further comprising, for one of said trunk coupling units:

input tap means for sensing an input signal applied from the corresponding station to the trunk coupling unit, output tap means for sensing an output signal provided from the trunk coupling unit to the corresponding station; and means differentially responsive to the amplitude of signals appearing on the input tap means and the output tap means for providing a signal indicative of the traffic in-out (TIO) status of the corresponding station.

5. The apparatus of claim 4, wherein said tap means are provided for each trunk coupling unit.

6. The apparatus of claim 4 further comprising, for one of said trunk coupling units:

storage means dedicated to said trunk coupling unit; and actuating means responsive to the occurrence on one of said tap means of an AMP or SMP frame with the A and C bits both reset to a logical zero state for storing the source address from said frame in said storage means.

7. The apparatus of claim 6, wherein said tap means, said storage means, and said actuating means are provided for each trunk coupling unit.

8. In an apparatus for configuring and maintaining a token ring network of the type including a plurality of trunk coupling units each adapted to receive a cable connection from a station and being serially connected on a common trunk cable to permit selective connection of a connected station to the cable, the improvement comprising, for one of said trunk coupling units:

input tap means for sensing an input signal applied from the connected station to the trunk coupling unit;

output tap means for sensing an output signal provided from the trunk coupling unit to the connected station; and means differentially responsive to the amplitude of signals appearing on the input tap means and the output tap means for providing a signal indicative of the traffic in-out (TIO) status of the connected station.

9. The apparatus of claim 8, wherein said tap means are provided for each trunk coupling unit.

10. In a method for configuring and maintaining token ring network of the type including a plurality of trunk coupling units each adapted to receive a cable connection from a station and being serially connected on a common trunk cable to permit selective connection of a connected station to the cable, the steps of:

sensing an input signal applied from the connected station to the trunk coupling unit;

sensing an output signal provided from the trunk coupling unit to the connected station; and differentially processing the amplitudes of the signals sensed in the preceding two steps to produce a signal indicative of the traffic in-out (TIO) status of the connected station.

11. The method of claim 10 wherein all of said steps are performed with respect to each of said trunk coupling units.

* * * * *